UNITED STATES PATENT OFFICE.

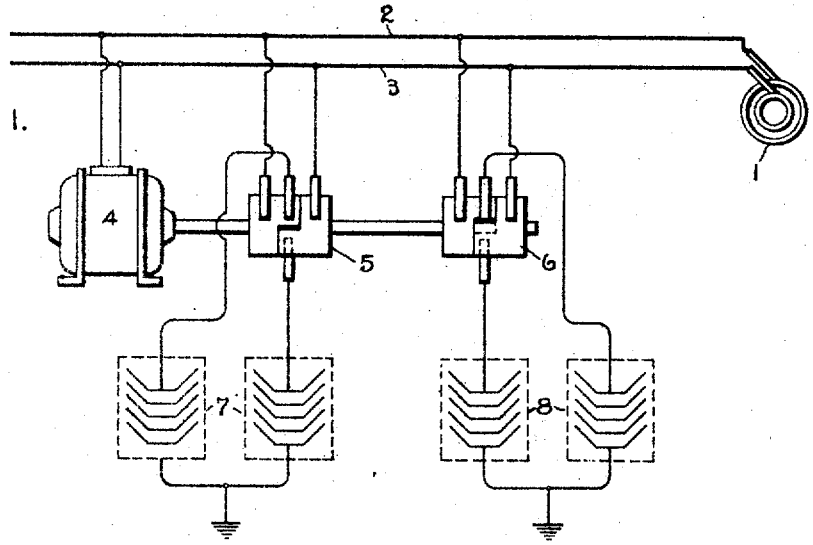
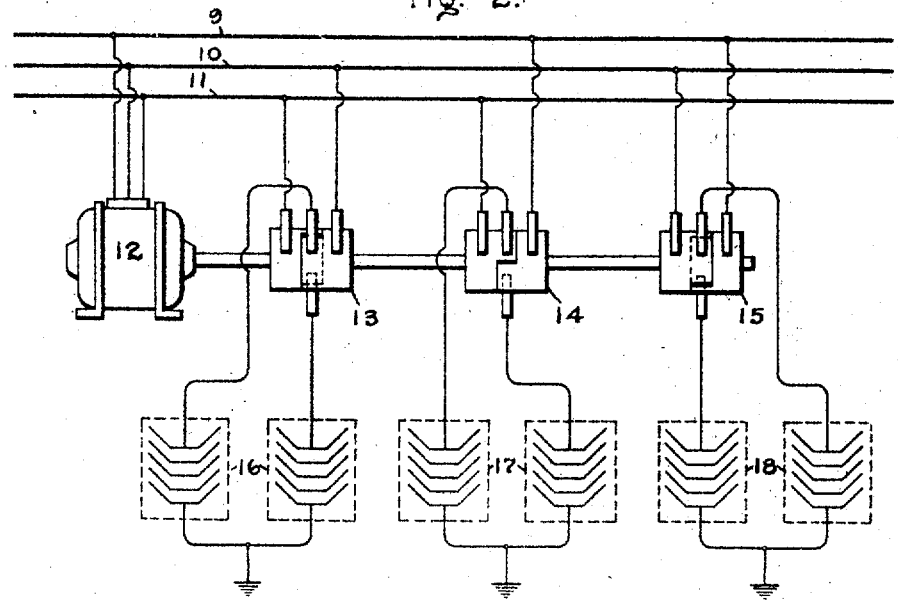

FRANK W. PEEK, JR., OF SCHENECTADY, NEW YORK, ASSIGNOR TO GENERAL ELECTRIC COMPANY, A CORPORATION OF NEW YORK.

LIGHTNING-ARRESTER.

973,555.  Specification of Letters Patent.  Patented Oct. 25, 1910.

Application filed February 2, 1910. Serial No. 541,455.

*To all whom it may concern:*

Be it known that I, FRANK W. PEEK, Jr., a citizen of the United States, residing at Schenectady, county of Schenectady, State of New York, have invented certain new and useful Improvements in Lightning-Arresters, of which the following is a specification.

My invention relates to lightning arresters and similar protective devices which respond to abnormal potentials, surges, and similar disturbances on the conductors of transmission lines and similar circuits, and more particularly to lightning arresters of the condenser type, such as electrolytic cells having aluminum electrodes.

Lightning arresters should be connected directly to the conductors of the circuit which is to be protected to remove abnormal potentials as quickly as possible and with a minimum disturbance, but it is nevertheless customary to insert a spark gap between the conductors and the lightning arresters of the aluminum cell type, because an aluminum cell is a leaky condenser and if directly connected to the circuit permits enough current to leak through to cause heating of the electrolyte and rapid destruction of the aluminum electrodes.

The object of my invention is to improve lightning arresters, particularly of the electrolytic condenser type, and to reduce the losses due to leakage current to such an extent that aluminum cells may be directly connected to the conductor to be protected. In accordance with my invention, this object is attained by means of any suitable connections which will maintain the lightning arrester in operative relation to the circuit to be protected and at the same time will cause the line potential impressed on the arresters to be substantially unidirectional. The aluminum cell may be connected to the circuit to be protected through some device such as a rectifier which will control the connections in synchronism with the potential on the conductor and thereby keep the cell directly connected to the line, but subjected only to unidirectional potential or to potential of which the greater part is in one direction.

My invention may be carried out by means of mechanical rectifiers or rectifying commutators, which open the circuit momentarily at the zero point of the potential wave and a further object of my invention is to arrange the rectifiers so as to have at every instant an uninterrupted and unbroken discharge path from the conductor to ground.

My invention will best be understood in connection with the accompanying drawings which illustrate diagrammatically some of the various forms in which my invention may be embodied, and in which—

Figure 1 is a diagrammatic illustration of a single-phase transmission system having aluminum cells directly connected to the conductors through mechanical rectifiers so related that there is always an uninterrupted discharge from path to ground; and Fig. 2 is a diagram illustrating one form of my invention applied to a three phase system with mechanical rectifiers between the conductors of the system and the aluminum cells.

In the particular embodiment of the invention shown in Fig. 1, the alternator 1 supplies alternating potential to the conductors 2 and 3 of the alternating current circuit which is to be protected. Any suitable form of rectifier may be used to derive from the alternating current circuit a substantially unidirectional potential, but for the purposes of illustration I have shown mechanical rectifiers or rectifying commutators driven by a synchronous motor 4, the shaft of which carries rectifying commutators 5 and 6 connected to a suitable current limiting device, such as pairs of aluminum cells 7 and 8. In the specific arrangement shown, the lower terminals of each pair of aluminum cells are connected to each other and to ground, while the other terminals are connected to the proper brush of the rectifying commutator. The commutators run in synchronism with the potential on the circuit and reverse the connections between each pair of condensers and the conductors 2 and 3 at substantially the zero point of the potential wave, hence the potential applied to each pair of aluminum cells is always in the same direction. This unidirectional potential is sufficient to keep the films on the plates of the cells in good condition, while experiment has shown that both the leakage current and the wear on the plates is very much less with unidirectional potential than with alternating potential.

While the preferred form of rectifier, such as that shown in the drawing, derives substantially unidirectional potential from the alternating current circuit, my invention may be carried out with other forms of rectifiers which do not completely rectify the alternating potential but do modify it to cause the greater portion of it to be unidirectional, although in such cases the advantages derived would not be as great as where the rectification is complete.

In a mechanical rectifier of the type shown in the drawings, the circuit is necessarily opened as the brushes pass from segment one of the rectifier to the next and although the system is always protected, because a discharge will break across the gap between the brush and the segment, and thence through the cell to ground, it is preferable that the discharge path to ground be uninterrupted and therefore the rectifiers are so arranged that they are in slightly different time phase relation to the potential on the alternating current circuit and are preferably arranged so that one opens and closes the discharge path slightly above the zero of the potential wave, while the other one opens and closes the path after the zero of the potential wave. The current to be controlled is very slight and rectifiers may be designed to operate satisfactorily under these conditions. One of the ways in which the rectifiers may be adjusted to secure this result is shown in Fig. 1, in which the rectifying commutators 5 and 6 are angularly displaced on the shaft of the synchronous motor 4 so that although the circuit through the pair of condensers 8 is open, the circuit through the other pair of condensers 7 is still closed, and by the time the circuit through the condensers 7 is opened by the rectifying commutator 5, the circuit through the other pair of condensers will be closed through rectifying commutators 6, hence at every instant the circuit is protected by an electrolytic cell directly connected to the conductors.

A polyphase system may easily be protected in accordance with my invention by increasing the number of rectifiers, so that each alternating current circuit is provided with a discharge path to ground through a rectifier and an electrolytic cell. For purposes of illustration, I have shown a three phase system having conductors 9, 10 and 11 connected through rectifying commutators similar to those shown in Fig. 1 and driven by a synchronous motor 12 on the shaft of which the rectifying commutators 13, 14 and 15 are mounted in proper angular relation to one another, each commutator being connected to two of the conductors of the three phase system and also to a pair of condensers 16, 17 and 18, the upper terminals of which are connected to the rectifiers and the lower terminals connected to each other and to ground.

To simplify the drawing, only one rectifier is shown between each circuit and each pair of condensers, so that with the particular type of rectifier shown there is an instant during each cycle when the circuit through the condensers is open, but as above pointed out, this does not deprive the system of protection, since the discharge will jump the slight gap at the rectifier and pass to ground through the condensers, but an uninterrupted path to ground from each circuit could be secured by using two rectifiers for each circuit arranged in suitable relation to each other, as shown in Fig. 1.

My invention may be embodied in many other forms than that shown and described and I therefore do not limit myself to the precise arrangement disclosed, but aim in the appended claims to cover all modifications within the spirit and scope of my invention.

What I claim as new and desire to secure by Letters Patent of the United States, is,—

1. A protective device for alternating current systems comprising a current limiting condenser forming a discharge path for abnormal potentials, and means for deriving a unidirectional potential from the system to be protected and for impressing said potential upon said condenser.

2. The combination with an alternating current circuit conductor, of a discharge path comprising a current limiting device and a rectifier connected to said conductor and to said current limiting device.

3. The combination with an alternating current circuit conductor, of a discharge path comprising an electrolytic condenser, and a rectifier connected between said condenser and said conductor.

4. A protective device for alternating current circuits comprising a condenser with one terminal connected to ground and a rectifier connected to the other terminal of said condenser and to the circuit to be protected.

5. The combination with two conductors forming an alternating current circuit, of two condensers each connected at one end to ground and a rectifier connected to said conductors and to the other ends of said condensers.

6. The combination with a plurality of conductors forming alternating current circuits, of a plurality of pairs of condensers with corresponding terminals connected to ground, and a rectifier connected to each pair of condensers and to two of said conductors to render the potential derived from said conductors and impressed on said condensers substantially unidirectional.

7. The combination with a conductor of an alternating current system, of a current limiting condenser, and means connected to said condenser and to said conductor whereby an unbroken discharge path from said conductor is maintained through said condenser and a rectified potential from said conductor is impressed on said condenser.

8. The combination with a conductor of an alternating current circuit, a current limiting means connected to ground, and two rectifiers connected between said conductor and said current limiting means and adjusted to cause one rectifier to reverse the connections between said current limiting means and said conductor in advance of the other rectifier, whereby an uninterrupted discharge path to ground is maintained.

9. The combination with a conductor of an alternating current circuit, of current limiting means and two rectifiers having different phase relations to the alternating potential and connected to said conductor and to said current limiting means.

10. The combination with the conductors of an alternating current circuit, of two discharge paths to ground, each comprising a condenser and a rectifier connected between said condenser and said conductor, said rectifiers being adjusted to operate in different time phase relation with the alternating potential and thereby open and close the circuit through one condenser while maintaining an uninterrupted circuit through the other condenser.

11. The combination with the conductors of an alternating current circuit, of two discharge paths to ground, each comprising an electrolytic condenser and a rectifying commutator connected between said condenser and said conductor, said rectifying commutators being angularly displaced to complete the reversal of connections of one condenser to line before the connections of the other condenser are altered.

In witness whereof, I have hereunto set my hand this 31st day of January, 1910.

FRANK W. PEEK, Jr.

Witnesses:
BENJAMIN B. HULL,
HELEN ORFORD.